Figure 2A:
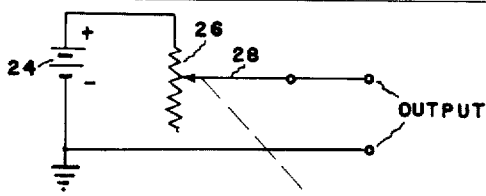

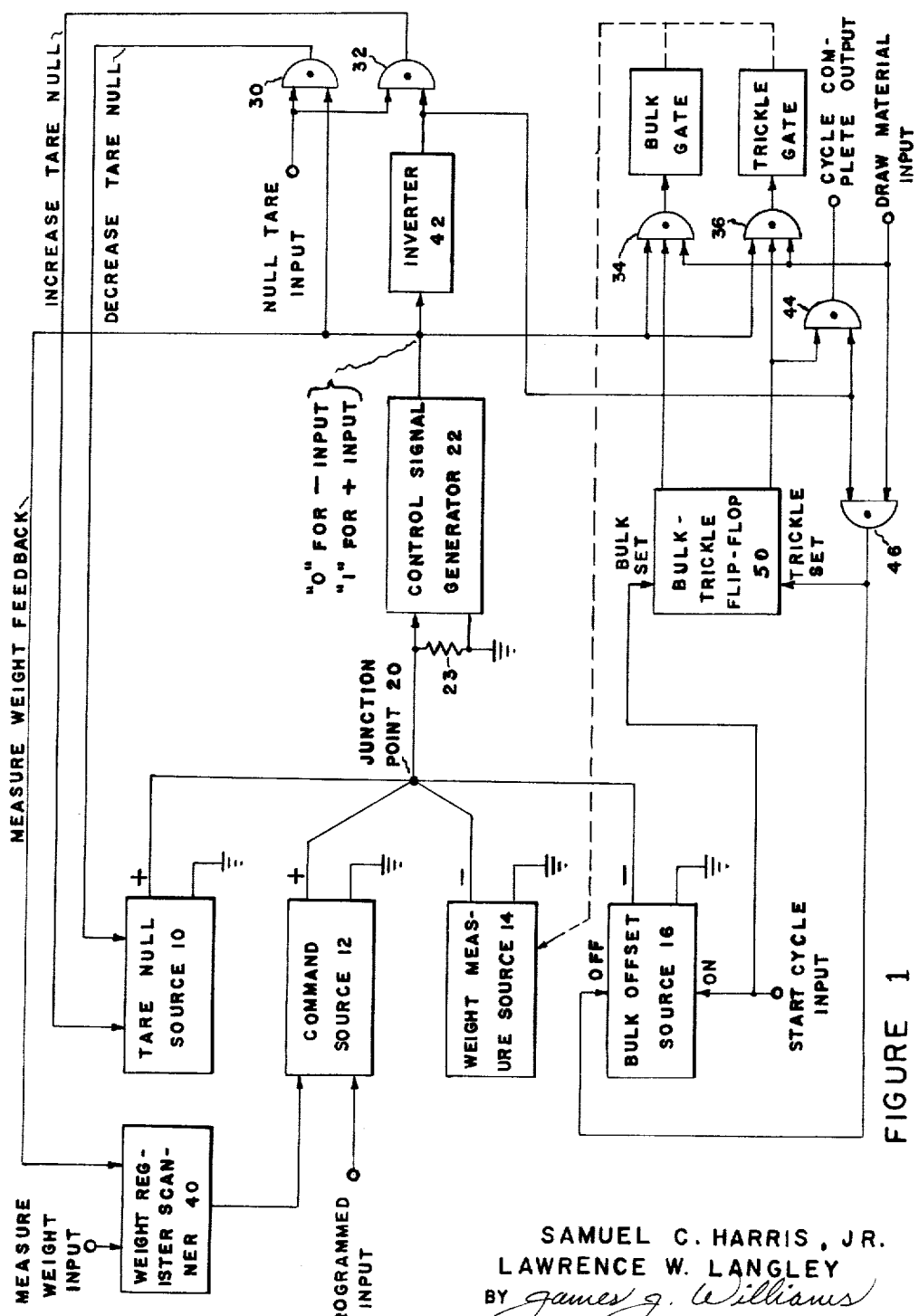

May 14, 1963   S. C. HARRIS, JR., ET AL   3,089,555
WEIGHING CONTROL SYSTEM
Filed Jan. 5, 1962   2 Sheets-Sheet 2

SAMUEL C. HARRIS, JR.
LAWRENCE W. LANGLEY
BY James J. Williams
ATTORNEY

United States Patent Office 3,089,555
Patented May 14, 1963

3,089,555
WEIGHING CONTROL SYSTEM
Samuel C. Harris, Jr., and Lawrence W. Langley, Waynesboro, Va., assignors to General Electric Company, a corporation of New York
Filed Jan. 5, 1962, Ser. No. 164,550
4 Claims. (Cl. 177—81)

The invention relates to a weighing control system, and particularly to a weighing control system for controlling material as it is being supplied so as to provide the desired weight of material.

The present manufacture of certain products, for example refractory materials such as firebrick, has reached a fairly high degree of refinement despite such manufacture under mass production or mass quantity techniques. The different basic ingredients which make up the final product must be carefully and accurately measured so that the final product has the desired properties or characteristics. Such measurements are usually made by weight.

Accordingly, an object of the invention is to provide a novel weighing control system for controlling a material as it is being supplied.

Another object of the invention is to provide a novel weighing control system which accurately controls the weight of material being supplied and which may provide for any tare weight which may be present.

Another object of the invention is to provide a novel weighing control system which accurately controls the weight of material being supplied and which may measure and indicate the weight of material which has been supplied.

In addition to requiring careful and accurate weighing of material or ingredients, present manufacture may require a large number of different basic ingredients in the final product. At present, it is not unusual for a product to require a mixture of material which weighs hundreds of pounds and which may have any number of different ingredients ranging in amounts from one pound to hundreds of pounds. Such a range of weights and different ingredients results in difficult conditions for a weighing control system.

Therefore another object of the invention is to provide a weighing control system which controls the weight of material being supplied and which permits each ingredient to be supplied at a bulk rate and/or at a trickle rate.

In accordance with the invention, a command signal source and a weight signal source are provided, the command source providing a signal indicative of the desired weight of material and the weight source providing a signal indicative of the weight of material supplied. A common junction is coupled to both sources, and means are coupled to the common junction for providing a control signal which is indicative of the relative values of the two signals. If the command signal bears one relation to the weight signal, a control signal is produced which indicates that an additional weight of material should be supplied; if the command signal bears a different relation to the weight signal, a control signal is produced which indicates that the desired weight of material has been supplied. A tare null source may be coupled to the common junction to provide or compensate for any tare weight present in the receptacle for the material being supplied. Also, a bulk weight offset source may be coupled to the common junction to provide or make allowance for supplying some material at a trickle rate after all but a predetermined weight of material has been supplied at a bulk rate. Also, the weight of material which has been supplied may be measured if desired.

Figure 2B:
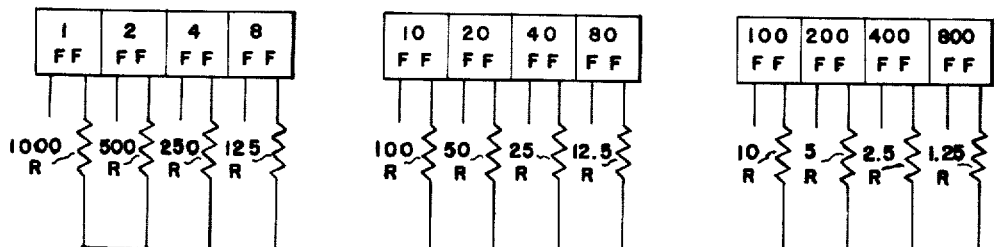

The invention will be better understood from the following description given in connection with the accompanying drawing, and its scope will be pointed out in the claims. In the drawing:

FIGURE 1 shows a block diagram of a preferred embodiment of a weighing control system in accordance with the invention; and FIGURES 2a and 2b show more detailed diagrams of certain portions of the block diagram of FIGURE 1.

*System Description*

The embodiment shown in FIGURE 1 contemplates a weighing control system for use with one source of material and with one weight measuring device or indicator. However, it is to be understood that where there are a plurality of sources of material, a number of comparable systems may be used or a single system may be used in connection with some movable receiver or receptacle such as a loading car which carries the control system and which is moved from source to source. In the embodiment of FIGURE 1, it has been assumed that weights of material between one pound and 999 pounds inclusive may be programed or called for, although other ranges of weights (including fractional parts of a pound) may be provided for. The control system can be used in any application which can weigh the material and provide a signal indicative of the smallest weight increment desired and which can supply the material at the desired rate. The embodiment shown in FIGURE 1 includes four signal sources: an optional tare null source 10, a command source 12, a weight measure source 14, and an optional bulk offset source 16. Each of these sources 10, 12, 14, 16 supplies a signal of a given value or magnitude and characteristic or polarity to a common junction or summing point 20. It is preferred that this signal be a current signal having a magnitude indicative of or proportional to the intelligence it represents and having either a plus or a minus polarity or direction (as indicated) relative to a point of reference potential such as ground. Preferred embodiments of the tare null source 10 and the command source 12 are shown in greater detail in FIGURES 2a and 2b of the drawing.

The tare null source 10, which is optional, provides a positive current which is supplied by a source of direct current potential 24 connected to a potentiometer or variable resistor 26 as shown in FIGURE 2a. The negative terminal of the source of potential 24 is connected to ground. A slider or contact 28 engages the potentiometer 26 and provides the positive current output as indicated. The position of the slider 28 determines the amount of positive current so provided. This position is attained or changed in accordance with some suitable mechanical drive 29 which is activated in either of two directions by appropriate increasing tare null signals or decreasing tare null signals provided by the leads shown in FIGURE 1.

The command source 12 provides a positive current having a value or magnitude indicative of the desired weight of material which is to be provided. The system shown in FIGURE 1 has been assumed to control weights between 0 and 999 pounds in increments of one pound. As shown in FIGURE 2b, the command source 12 has been provided with three decades, one representing 0 to 9 increments of one pound, one representing 0 to 9 increments of ten pounds, and one representing 0 to 9 increments of 100 pounds. Each decade includes four binary flip-flops (or bistable multivibrators) and four associated respective weighting resistors which can be energized with preferably equal voltages. Such devices or their equivalent are known in the art. All of the weighting resistors are coupled at one end to a common output bus. These weighting resistors have the relative magnitudes (based on a resistance R which, for a certain voltage, would allow a current representing 1000 pounds to flow) as indicated in FIGURE 2b. The state of the flip-flops is determined by the input (preferably programed and supplied from a suitable source not shown) which is applied to the flip-flops. A flip-flop in the set state energizes its weighting resistor, and a flip-flop in the reset state deenergizes its weighting resistor. The magnitude of the weighting resistors determines the quantity or magnitude of current so provided. For the purposes of illustration at this point and subsequently, it is assumed that a weight of 861 pounds is to be provided or supplied. If a command current indicating a weight of 861 pounds is to be provided, the 800 flip-flop is set to energize its weighting resistor 1.25R in the 100 pound decade, the 40 and 20 flip-flops are set to energize their weighting resistors 25R and 50R in the ten pound decade, and the 1 flip-flop is set to energize its weighting resistor 1000R in the one pound decade. If equal voltages are provided for the weighting resistors, the resistors provide currents inversely proportional to their magnitudes. If the voltage supplied on energization is ten volts and if R is equal to ten ohms, it will be seen that the weighting resistor 1.25R provides a current of 800 milliamperes, the weighting resistors 25R and 50R provide 40 and 20 milliamperes respectively, and the weighting resistor 1000R provides 1 milliampere, this being a total of 861 milliamperes.

The weight measuring source 14 may be any weight-to-electrical-signal transducer which is suitable, such devices being known in the art and generally referred to as load cells. The weight measuring source 14 provides a negative-going current which increases in magnitude (in a negative direction) with increased weight. The weight measuring source 14 is appropriately coupled to the receiver or receptacle of material so that its output or negative current reflects the weight of the receptacle and the material supplied to it. Such a device has not been illustrated since it is known in the art and the description given with such a known device is considered adequate. Likewise, no detailed diagram of the optional bulk offset source 16 has been given. This source 16 is also a source of negative current which can be set at any predetermined fixed magnitude. The bulk offset source 16 is provided for subtracting a portion of the positive command current and thus reserving, in effect, some predetermined amount of weight so that this predetermined amount of weight may be supplied at a different rate, preferably a trickle or a slow rate as opposed to a bulk rate. The bulk offset source 16 is arranged to be in either an off or an on condition in response to appropriate signals, thus either providing no current or providing its predetermined current. Since the command source 12 has been exemplified as providing one milliampere per pound of desired weight, the other sources are likewise arranged to provide a positive or negative current, as the case may be, of one milliampere per pound of weight to be indicated.

The junction point 20 is coupled to the input of a control signal generator 22 which may be a high gain amplifier having a clipped output which is preferably only positive-going. It is to be noted that the common junction point 20 permits each of the sources 10, 12, 14, 16 to be coupled directly to the generator 22 without any amplification. The output of the generator 22 is clipped and is made positive-going for use in logic circuitry. The generator 22 has an input impedance 23 coupled between the junction point 20 and ground. Under basic electrical laws, all of the currents flowing toward or into the junction point 20 must equal all of the currents flowing away from or out of the junction point 20. If the algebraic sum of the currents provided by the sources 10, 12, 14, 16 does not equal zero, the inequality or difference is reflected or indicated by a current flow through the input impedance 23 of the control signal generator 22. Thus, if the sum of the positive currents from the sources 10, 12 is greater than the sum of the negative currents provided by the sources 14, 16, a positive current flows from the junction point 20 through the input impedance 23 of the control signal generator to ground. This will hereinafter be referred to as a positive input signal. However, if the negative currents provided by the sources 14, 16 exceed the positive currents provided by the sources 10, 12, a negative current then flows from ground through the input impedance 23 of the control signal generator 22 to the junction point 20. This will hereinafter be referred to as a negative input signal. The input signals applied to the control signal generator 20 are amplified and clipped as mentioned. If a positive input signal is applied to the control signal generator 22, a positive output is provided by the generator 22, this positive output being hereinafter referred to as a logic 1 output. If, however, a negative input signal is applied to the control signal generator 22, no voltage output, hereinafter referred to as a logic 0, is provided by the control signal generator 22. This is indicated by the legends at the output of the generator 22. The generator 22 may have some finite deadband in which it is insensitive to a change of current and input signal. This deadband depends on a number of factors not pertinent here. In a practical embodiment of a generator, this deadband may correspond to a current $\Delta$ of one-tenth of a milliampere. Thus, where one milliampere of current represents one pound of weight, an error of one-tenth pound may result from the deadband current $\Delta$. A smaller deadband and a corresponding smaller deadband current $\Delta$ may be attained by appropriate circuit design. However, other circuit errors, such as the resolution of the weight measuring source 14, may not justify providing a smaller deadband.

The output from the control signal generator 22 is applied to three AND gates 30, 34, 36. All of the gates shown in FIGURE 1 are AND gates. An AND gate is known in the art and requires that all of its inputs meet a certain condtion before providing a certain output condition. For the purposes of explanation, it has been assumed that each of the AND gates shown requires that all of its inputs be at logic 1 to produce a logic 1 at its output. The output of the control signal generator 22 may also be applied to a weight register scanner 40 which can be used if desired to control the command source 12 when the weight of material supplied is to be measured. The output of the control signal generator 22 is also applied to an inverter 42, this inverter 42 merely inverting the output of the generator 22 in terms of logic. If the output of the generator 22 is a logic 1, the output of the inverter 42 is a logic 0. If the output of the generator 22 is a logic 0, the output of the inverter 42 is a logic 1. The output of the inverter 42 is applied to three AND gates 32, 44, 46. The gates 30, 32 provide increase or decrease signals for the tare null source 10 depending upon which of the gates 30, 32 produces a logic 1. A null tare input signal is provided to the gates 30, 32 during the time the tare is to be nulled out. A draw material input signal is provided for the gates 34, 36, 46 to provide these gates with a logic 1 input when it is desired that material be drawn from its source and supplied to a receptacle or receiver. A bulk-trickle flip-flop 50 (bistable multivibrator) is provided, this flip-flop 50 taking one of two conditions depending upon whether a bulk set signal or a trickle set signal is provided. If a bulk set signal is applied to the flip-flop 50, the flip-flop 50 provides a logic 1 at the AND gate 34 and a logic 0 at the AND gates 36, 44. If a trickle set signal is applied to the flip-flop 50, the flip-flop 50 provides a logic 1 at the AND gates 36, 44 and a logic 0 at the AND gate 34. The output of the AND gate 44 produces or provides a cycle complete output signal. The output of the AND gate 46 is used to turn off the bulk offset source 16 and at the same time to provide a trickle set signal to the flip-flop 50. A start cycle input signal is provided to turn on the bulk offset source 16 and to provide a bulk set signal to the flip-flop 50. The output from the AND gate 34 is used to control a bulk gate, this bulk gate being some suitable mechanism which permits material to be supplied or drawn from its source at a bulk rate. The output of the AND gate 36 is used to control a trickle gate, this trickle gate being some suitable mechanism which permits material to be supplied or drawn from the source at a trickle rate. These gates may be electromagnetically operated trap doors of a bulk size and a trickle size, such doors permitting material to flow from the source at either a bulk rate or at a trickle rate into a car or receiver or receptacle. A dashed line is shown between the bulk and trickle gates and the weight measure source 14. This dashed line is intended to indicate that as the gates are opened to permit material to be supplied to a receptacle, the weight measure source 14 is operated accordingly with the added weight of material so supplied.

System Operation

The operation of the weighing control system will now be described and explained in terms of a specific example. This example is set out in the following table:

| Step or Operation | Total Wt. Present | Wt. Meas. Source Current | Tare Null Source Current | Command Source Current | Bulk Offset Source Current | Generator Input Current | Generator Logic Output |
|---|---|---|---|---|---|---|---|
| Measure tare | 33 | −33 | +50 | 0 | 0 | +17 | 1 |
|  | 33 | −33 | +33 | 0 | 0 | 0 | 1 |
| Tare nulled out | 33 | −33 | +33−Δ | 0 | 0 | −Δ | 0 |
| OR |  |  |  |  |  |  |  |
| Measure tare | 33 | −33 | +20 | 0 | 0 | −13 | 0 |
|  | 33 | −33 | +33 | 0 | 0 | 0 | 1 |
| Tare nulled out | 33 | −33 | +33−Δ | 0 | 0 | −Δ | 0 |
| Start cycle-bulk draw | 33 | −33 | +33−Δ | +861 | −25 | +836−Δ | 1 |
| After 500 lbs. drawn | 533 | −533 | +33−Δ | +861 | −25 | +336−Δ | 1 |
| After 835 lbs. drawn | 868 | −868 | +33−Δ | +861 | −25 | +1−Δ | 1 |
| After 836 lbs. drawn | 869 | −869 | +33−Δ | +861 | −25 | −Δ | 0 |
| Stop bulk draw. |  |  |  |  |  |  |  |
| Start trickle draw | 869 | −869 | +33−Δ | +861 | 0 | +25−Δ | 1 |
| After 860 lbs. drawn | 893 | −893 | +33−Δ | +861 | 0 | +1−Δ | 1 |
| After 861 lbs. drawn | 894 | −894 | +33−Δ | +861 | 0 | −Δ | 0 |

In this example, it has been assumed that a weight of 861 pounds is to be provided, that the tare weight of the receptacle is 33 pounds, that the bulk offset weight is 25 pounds, and that the generator 22 has an indeterminate logic output for input currents from zero to minus Δ milliampere. Before the command source current is applied to the junction point 20, the tare of 33 pounds may be nulled out or eliminated. This is done by weighing the receptacle and any tare by the weight measure source 14 and comparing its current with whatever current is being provided by the tare null source 10. When the receptacle and tare are weighed, the tare null source 10 may be in the condition of providing a current equivalent to more or less than a weight of 33 pounds as a result of a previously different tare weight. For illustrative purposes, two previous conditions have been assumed, these being a previous tare weight of 50 pounds or a previous tare weight of 20 pounds. In the first illustration, a negative current of 33 milliamperes is provided by the weight measure source 14, a positive current of 50 milliamperes is provided by the tare null source 10 from a prior situation, no current is provided by the command source 12 and the bulk offset source 16, and thus a net positive current of 17 milliamperes (50 milliamperes minus 33 milliamperes) is provided to the input of the control signal generator 22. This net positive current of 17 milliamperes causes the control signal generator 22 to provide a logic 1 at its output. A logic 1 is now provided at the input of the gates 30, 32 by a null tare signal applied to the null tare input. Since the control signal generator 22 is producing a logic 1 output, the AND gate 30 provides a logic 1 output which provides a signal which decreases the tare null. The AND gate 32 has a logic 0 applied to it by the inverter 42 and therefore produces a logic 0 output. This decrease tare null signal causes the potentiometer arm 28 (in FIGURE 2a) to move downward. When a positive current of 33 milliamperes is provided, the net current to the generator 22 is zero. However the logic 1 output of the generator 22 remains, and the decrease tare null signal continues. Then, a tare null positive current of 33 minus Δ milliamperes is provided. At this point, a net negative current of Δ milliampere is provided to the input of the control signal generator 22. The output of the control signal generator 22 then becomes a logic 0. At this point, it would be appropriate to remove the null tare input signal to prevent further hunting or oscillation. Such removal can be effected by the transition from a logic 1 to a logic 0 at the output of the generator 22, or by other suitable means. In the second illustration, a negative current of 33 milliamperes is provided by the weight measure source 14, a positive current of 20 milliamperes is provided by the tare null source 10 from a prior situation, no current is provided by the command source 12 and the bulk offset source 16, and thus a net negative current of 13 milliamperes (20 milliamperes minus 33 milliamperes) is provided to the input of the control signal generator 22. This net negative current of 13 milliamperes causes the control signal generator 22 to provide a logic 0 at its output. A logic 1 is now provided at the input of the gates 30, 32 by a null tare signal applied to the null tare input. Since the control signal generator is producing a logic 0 output, and since the inverter 42 changes this to a logic 1, the AND gate 32 provides a logic 1 output which provides a signal which increases the tare null. The AND gate 30 has a logic 0 applied to it directly from the generator 22 and therefore produces a logic 0 output. This increase tare null signal causes the potentiometer arm 28 (in FIGURE 2a) to move upward until a positive current of 33 milliamperes is provided. The net current to the generator 22 becomes zero so that its output becomes a logic 1. This logic 1 combined in the AND gate 30 causes a logic 1 output which provides a signal which decreases the tare null. This causes the potentiometer arm 28 to move downward until a positive current of 33 minus Δ milliamperes is provided. At this point, a net negative current of Δ milliampere is provided to the input of the control signal generator 22, and its output becomes a logic 0. If the transition from a logic 1 to a logic 0 at the output of the generator 22 is utilized as in the other tare example, the null tare input signal may be removed to prevent further hunting or oscillation.

The bulk offset source 16 has been assumed to provide a negative offset current of 25 milliamperes which corresponds to 25 pounds. Other values may be used. After the tare has been nulled, the command source 12 is energized so it provides a positive current of 861 milliamperes (corresponding to the desired 861 pounds) as already described, and the bulk offset source 16 is turned on by a signal applied to its start cycle input so it provides a negative current of 25 milliamperes. A negative current of 33 milliamperes is provided by the weight source 14 and a positive current of 33 minus Δ milliamperes is provided by the tare null source 10. Thus a net positive current of 836 minus Δ milliamperes (861 milliamperes, plus 33 minus Δ milliamperes, minus 25 milliamperes, minus 33 milliamperes) is provided to the input of the control signal generator 22. This is shown in the table. This current provides a logic 1 at the output of the control signal generator 22 and to the AND gates 34, 36. The start cycle input signal previously provided a bulk set signal for the bulk-trickle flip-flop 50 so that it supplies a logic 1 to the AND gate 34. When it is desired for the material to be supplied or drawn, a logic 1 signal is supplied to the AND gates 34, 36 by the application of a signal at the draw material input. At this time the AND gate 34 provides a logic 1 output signal which opens the bulk gate. The AND gate 36 does not provide a logic 1 output signal because the bulk-trickle flip-flop 50 is supplying it with a logic 0. Material is then supplied to the receptacle at a bulk rate. As it is, the weight measuring source 14 supplies increasing negative current. The various currents and the generator logic output are shown in the table after 500 pounds have been drawn. After 835 pounds of material have been drawn, a net positive current of one minus Δ milliampere is provided to the generator 22 so that it still produces a logic 1 which still permits material to be drawn at the bulk rate. However, as soon as 836 pounds of material have been drawn, a net negative current of Δ milliampere is provided to the generator 22 so that it now produces a logic 0 output.

With the output of the control signal generator 22 now at a logic 0, the AND gate 34 immediately produces a logic 0 at its output which closes the bulk gate and stops the drawing of material at a bulk rate. The inverter 42 now provides a logic 1 at its output in response to the logic 0 input, and this logic 1, along with the logic 1 supplied by the draw material input, causes the AND gate 46 to provide a logic 1 at its output. This logic 1 turns off the 25 milliamperes of negative current from the bulk offset source 16 and also provides a trickle set signal to the bulk-trickle flip-flop 50. This causes a logic 1 to be provided by the bulk-trickle flip-flop 50 to the AND gate 36, and a logic 0 to be provided to the AND gate 34. When the bulk-trickle flip-flop 50 provides a logic 1 to the AND gate 36, it also provides a logic 1 to the AND gate 44. This logic 1 with the logic 1 from the inverter 42 produces a logic 1 at the output of the AND gate 44 to provide a cycle complete signal. However this is only momentary as will be explained below. As soon as the bulk offset source 16 is turned off, there is again a net positive current (25 minus Δ milliamperes) supplied to the control signal generator 22. The generator 22 immediately produces a logic 1 at its output again. The output of the inverter 42 becomes a logic 0 which results in a logic 0 output at the AND gate 44. Thus the cycle complete signal is removed. If this signal is to be used as a function or indication, a suitable time delay circuit may be used to prevent a momentary false function or indication. The bulk gate is kept closed because the bulk-trickle flip-flop 50 is now applying a logic 0 to the AND gate 34. The AND gate 36 is now provided with a logic 1 at each of its inputs and so produces a logic 1 at its output. This causes operation or opening of the trickle gate so that additional material is drawn at a trickle rate. After 860 pounds of material have been supplied, a net positive current of one minus Δ milliampere is provided to the generator 22 so that it still produces a logic 1 which still permits material to be drawn at the trickle rate. However, as soon as 861 pounds of material have been supplied, a net negative current of Δ milliampere is provided to the generator 22 so that it now produces a logic 0 at its output. The logic 0 at the output of the control signal generator 22 causes the AND gate 36 to produce a logic 0 at its output and then turn off the trickle gate. The inverter 42 produces a logic 1 at its output and this logic 1, along with the logic 1 supplied by the bulk-trickle flip-flop 50, causes the AND gate 44 to produce a logic 1 at its output indicating that the cycle is complete. While this is a stable condition, the draw material signal may be removed to provide a more stable condition which is changed only by external signals calling for a new cycle and a new draw.

It will be seen that the circuit or the system just described permits accurate control and measuring of the weight while the material is being supplied. Further, the system requires only one comparison element or control generator to produce the output control signal in response to any number of input signals which are needed or desired to influence or affect the control signal. There is no inherent error caused by generator input currents from zero to minus Δ milliampere because tare nulling and material drawing are performed in the same sense. That is, the extra tare null current Δ cancels the balance current Δ required in drawing. If circumstances justify, the accuracy of the control system may be increased by providing additional command signals and corresponding flip-flops which measure smaller increments of weight, for example, tenths, hundredths, and thousandths of a pound. Thus, the first thousandth of a pound in excess of the required amount would cause the control signal generator 22 to produce a logic 0 output that ends the cycle.

After the material has been drawn or supplied, the control system can be used to measure the actual weight of the material drawn. This is accomplished by the optional weight register scanner 40 which is coupled to the flip-flops of the command source 12 and which is rendered operative by a weight measure input signal. The weight register scanner 40 is, in effect, a programing device which first resets all of the flip-flops back to zero and deenergizes the weighting resistors so that the command source 12 produces no output current. The weight register scanner 40 then scans or sets each of the flip-flops to energize its respective weighting resistor beginning with the most significant (the 800 flip-flop), and continues sequentially through the other flip-flops of descending significance and ends with the least significant (the 1 flip-flop). Whether a particular flip-flop is kept set (and its weighting resistor energized) depends upon the measure weight feedback signal derived from the output of the control signal generator 22. A logic 0 output keeps the flip-flop set, but a logic 1 output resets the flip-flop. In the example above, 861 pounds of material and 33 pounds of tare are present. The tare null source 10 provides a positive current of 33 minus Δ milliamperes. So the weight register scanner 40 must only weigh the 861 pounds which is indicated by the negative current of 861 milliamperes provided by the weight measure source 14. When the 800 flip-flop is set, it provides a positive current of 800 milliamperes which leaves a net negative current of 61 milliamperes applied to the generator 22. The generator 22 produces a logic 0 output which is applied to the weight register scanner 40. The scanner 40 keeps the 800 flip-flop set in response to the logic 0. The scanner 40 then sets the 400 flip-flop, this resulting in a net positive current of 339 milliamperes. A logic 1 is produced by the generator 22 in response to this positive current, this logic 1 causing the scanner 40 to reset the 400 flip-flop. The remaining flip-flops are likewise set in sequential fashion, with the 40 flip-flop and the 20 flip-flop being kept set. At this point a positive current of 860 milliamperes is provided by the command source 12, and this results in a net negative current of 1 milliampere. Setting of the 8, 4, and 2 flip-flops results in a net positive current and a logic 1 which results in these flip-flops being reset. The 1 flip-flop is then set and a positive current of 861 milliamperes is provided resulting in a net current of zero. The generator 22 does not change its logic 0 output so that the 1 flip-flop stays set. Setting of the 1 flip-flop can be used to halt the weight measure cycle. Setting of the flip-flops (in this example the 800, 40, 20, and 1 flip-flops) can be indicated in some way (such as lights) to provide an indication of the measured weight. If the weight being measured had been 800 pounds instead of 861 pounds, the 800 flip-flop would have been set. This would result in a net current of zero, but the generator 22 would still provide its logic 0 output (resulting from the net negative current prior to setting of the 800 flip-flop) so that the 800 flip-flop is kept set. All settings of the subsequent flip-flops would result in a net positive current and this would result in a logic 1 output that would reset these flip-flops. After the 1 flip-flop is set and reset, the weight measure cycle would end.

It will be seen that the weighing control system of the invention provides a new and novel means for controlling the weight of material supplied. This system incorporates electronic circuitry which provides improved and accurate operation which has not been previously attainable. It is to be understood that modifications or changes may be made without departing from the scope of the invention. For example, the tare null source 10 is not essential if the tare weight can be neglected. Likewise, the bulk offset source is not essential if drawing at a bulk rate is satisfactory or if drawing at any single rate (either bulk or trickle or somewhere in between) is permissible. Measuring the weight of the drawing material is also optional. Other modifications may be made by persons skilled in the art without departing from the spirit of the invention or from the scope of the claims.

What we claim as new and desire to secure by Letters Patent of the United States is:

1. A system for controlling the weight of material supplied at a bulk rate and at a trickle rate from a source to a receiver comprising a command source for producing a first polarity of current having a magnitude proportional to the desired weight of material, a weight source coupled to said receiver for producing a second and opposite polarity of current having a magnitude proportional to the weight of material supplied to said receiver, a tare source for producing a current having said first polarity and having a variable magnitude, an offset source for producing a current having said second polarity and having a magnitude proportional to the weight of material to be supplied at said trickle rate, means selectively energizing said offset source, a common summing junction coupled to said command, weight, tare, and offset sources, means coupled to said junction for producing a control signal indicative of the relative magnitudes of said currents, means coupled to said producing means and to said tare source for changing said tare current to a magnitude proportional to the tare weight of said receiver, means coupled to said producing means and to said material source for supplying said material at said bulk rate in response to the magnitude of said first polarity currents exceeding the magnitude of said second polarity currents, means coupled to said producing means and to said offset source for removing said offset current in response to the magnitude of said second polarity currents exceeding the magnitude of said first polarity currents, and means coupled to said producing means and to said material source for supplying said material at said trickle rate in response to the removal of said offset current and in response to the magnitude of said first polarity currents exceeding the magnitude of said second polarity current.

2. The system defined in claim 1 and further comprising scanning means for causing said command source to sequentially produce currents indicative of weights beginning with the most significant weight, means coupling said producing means to said scanning means for maintaining said produced currents in response to the magnitude of said second polarity current exceeding the magnitude of said first polarity currents, and means coupled to said scanning means for indicating said maintained currents.

3. A system for controlling the weight of material supplied at a first rate and at a second rate comprising a command source for producing a signal having a first characteristic and being indicative of the desired weight of material, a weight source for producing a signal having a second characteristic and being indicative of the weight of material supplied, an offset source for producing a signal having said second characteristic and being indicative of the weight of material to be supplied at said second rate, means coupled to said command, weight, and offset sources for alternatively producing a first or a second control signal in response to said command, weight, and offset signals, means coupled to said producing means and adapted to supply said material at said first rate in response to said first control signal, means coupled to said producing means and adapted to supply said material at said second rate in response to said second control signal, and means coupled to said command source for causing said command source to provide a sequence of signals for indicating the weight of material supplied.

4. A system for controlling the weight of material supplied at a first rate and at a second rate from a source to a receiver comprising a command source for producing a first polarity of current having a magnitude proportional to the desired weight of material, a weight source coupled to said receiver for producing a second and opposite polarity of current having a magnitude proportional to the weight of material supplied to said receiver, an offset source for producing a current having said second polarity and having a magnitude proportional to the weight of material to be supplied at said second rate, a common summing junction coupled to said command, weight, and offset sources, means coupled to said junction for producing a control signal indicative of the relative magnitudes of said currents, means coupled to said producing means and to said material source for supplying said material at said first rate in response to the magnitude of said first polarity current exceeding the magnitude of said second polarity currents, means coupled to said producing means and so to said offset source for removing said offset current in response to the magnitude of said second polarity currents exceeding the magnitude of said first polarity current, means coupled to said producing means and to said material source for supplying said material at said second rate in response to the removal of said offset current and in response to the magnitude of said first polarity current exceeding the magnitude of said second polarity current, and means coupled to said command source for causing said command source to provide a sequence of currents and to maintain certain of said currents in response to said producing means, said maintained currents indicating the weight of material supplied.

References Cited in the file of this patent
UNITED STATES PATENTS

| | | |
|---|---|---|
| 2,868,491 | Thorsson | Jan. 13, 1959 |
| 2,926,010 | Kennaway | Feb. 23, 1960 |

UNITED STATES PATENT OFFICE

CERTIFICATE OF CORRECTION

Patent No. 3,089,555            May 14, 1963

Samuel C. Harris, Jr., et al.

It is hereby certified that error appears in the above numbered patent requiring correction and that the said Letters Patent should read as corrected below.

Column 4, line 36, for "condtion" read -- condition --; column 10, line 45, strike out "so".

Signed and sealed this 11th day of February 1964.

(SEAL)
Attest:

ERNEST W. SWIDER
Attesting Officer

EDWIN L. REYNOLDS

Acting Commissioner of Patents